United States Patent [19]

Tsutsui et al.

[11] Patent Number: 5,513,104
[45] Date of Patent: Apr. 30, 1996

[54] VEHICLE AUTOMATIC TRANSMISSION WITH VALVE DUTY FACTOR CONTROL

[75] Inventors: Teiji Tsutsui, Himeji; Sinji Watanabe, Amagasaki, both of Japan

[73] Assignee: Mitsubishi Denki Kabushiki Kaisha, Tokyo, Japan

[21] Appl. No.: 102,268

[22] Filed: Aug. 5, 1993

[30] Foreign Application Priority Data

Aug. 10, 1992 [JP] Japan .................. 4-212944

[51] Int. Cl.$^6$ .................................. B60K 41/08
[52] U.S. Cl. .................. 364/424.1; 477/63; 477/64
[58] Field of Search ............ 364/424.1; 192/103 R; 477/62, 63, 64, 65, 70, 71, 77, 78, 130, 131, 143, 148, 149

[56] References Cited

U.S. PATENT DOCUMENTS

| | | | |
|---|---|---|---|
| 4,244,244 | 1/1981 | Rembold et al. | 192/103 R |
| 4,262,335 | 4/1981 | Ahlen et al. | 364/424.1 X |
| 4,793,216 | 12/1988 | Hiramatsu et al. | 364/424.1 X |
| 4,947,330 | 8/1990 | Hiramatsu | 364/424.1 |
| 4,953,090 | 8/1990 | Narita | 364/424.1 |
| 5,038,287 | 8/1991 | Taniguchi et al. | 364/424.1 |
| 5,109,826 | 5/1992 | Kato | 123/564 |
| 5,111,717 | 5/1992 | Takeuchi et al. | 477/148 |
| 5,303,616 | 4/1994 | Palansky et al. | 477/63 |
| 5,370,016 | 12/1994 | Fujita et al. | 364/424.1 X |

FOREIGN PATENT DOCUMENTS 127301   5/1989   Japan .

Primary Examiner—Collin W. Park
Attorney, Agent, or Firm—Sughrue, Mion, Zinn, Macpeak & Seas

[57] ABSTRACT

A controller device for vehicle automatic transmission including oil-pressure driven type friction elements controls the duty factors of the solenoid valves for the respective friction elements involved in the gear shift. In the first control interval A, the duty factors are controlled in accordance with predetermined patterns, such that the friction elements engage with predetermined amounts of slip at the actual beginning of the gear shift. The first interval A is terminated either when a change in the rotational speed of the input shaft of the automatic transmission is detected or when a predetermined length of upper limit for the first interval A expires. When the first interval A terminates, the second control interval B begins, and the duty factors are controlled by a feedback control method. The second interval B is terminated either when the rotational speed of the input shaft of the automatic transmission reaches a predetermined level corresponding to the completion of the gear shift or when a predetermined length of the upper limit for the second interval B expires. The upper limits for the first and the second intervals may be measured by respective timers.

8 Claims, 11 Drawing Sheets

VEHICLE AUTOMATIC TRANSMISSION WITH VALVE DUTY FACTOR CONTROL

BACKGROUND OF THE INVENTION

This invention relates to controller devices for vehicle automatic transmissions including oil-pressure driven type friction elements for engaging and disengaging the speed change gears of the transmission to realize desired gear ratios, and more particularly this invention relates to electronic control devices for controlling the electric oil pressure converter valves to regulate the oil pressures supplied to the oil-pressure driven type friction elements to engage and disengage the speed change gears.

A conventional controller device for vehicle automatic transmission by which the oil pressures of the friction elements of the transmission are controlled by means of electric oil pressure converter valves (solenoid valves) is disclosed, for example, in Japanese Laid-Open Patent (Kokai) Nos. 3-163265 and 1-27301. The transmission is capable of realizing a plurality of forward gear ratios, and electric oil pressure converter valves are inserted in the oil lines communicating the oil-pressure driven type friction elements and the manual valves. The oil pressures supplied to the oil-pressure driven type friction elements are directly controlled by means of the electric oil pressure converter valves. The time at which the friction elements corresponding to the desired gear ratio begin to engage (the actual start time of the gear shifting operation) is determined on the basis of the amount of the variation of the rotational speed of the input shaft to the transmission. The operating oil pressures of the friction elements are controlled from this start time of the gear shift.

The above conventional controller device for vehicle automatic transmission, however, has the following disadvantage. The oil-pressure driven type friction elements are controlled to perform the gear shift, wherein the start and the end of the gear shifting operation are determined on the basis of (the variations of) the rotational speed of the input shaft to the transmission. However, due to the variation in the production characteristics of the friction elements or the variation in the operating oil pressures, the engagements of the friction elements for realizing the desired gear ratio may be insufficient, such that the variation in the rotational speed of the input shaft to the transmission may not rise to a predetermined reference level. Then, the start of the gear shift cannot be determined, and hence the gear shifting operation is continued indefinitely to cause excessive slips of the friction elements. This not only results in an uneconomical loss of motive power, but also in rapid and premature abrasion of the friction elements.

SUMMARY OF THE INVENTION

It is therefore an object of this invention to provide a controller device for vehicle automatic transmission by which the gear shifting operation can always be completed within a predetermined length of time such that the uneconomical loss of motive power or the premature and rapid abrasion of the oil-pressure driven type friction elements can effectively prevented.

The above object is accomplished in accordance with the principle of this invention by a controller device for a vehicle automatic transmission which includes: at least one friction element whose engagement/disengagement state is changed during a gear shifting operation; and actuator means for engaging and disengaging the friction element in response to a control signal; wherein the controller device comprises: rotational speed sensor means for detecting a rotational speed of an input shaft of the automatic transmission; first shift control means, coupled to the rotational speed sensor means, for controlling the actuator means in accordance with a first control method over a First control interval, wherein the First control interval is terminated either when a change in the rotational speed of the input shaft of the automatic transmission is detected, or when a length of the first control interval exceeds a first predetermined upper limit; second shift control means for controlling the actuator means in accordance with a second control method over a second control interval beginning at a termination of the first control interval, wherein the second control interval is terminated either when the rotational speed of the input shaft of the automatic transmission reaches a predetermined level corresponding to a completion of the gear shifting operation, or when a length of the second control interval exceeds a second predetermined upper limit.

Preferably the actuator means includes an electric oil pressure converter valve (a solenoid valve). It is preferred that the controller device further includes: a first timer for measuring a time starting at a beginning of the first control interval; and a second timer for measuring a time starting at a beginning of the second control interval; wherein the first shift control means terminates the first control interval when a time measured by the first timer exceeds the first predetermined upper limit, and the second shift control means terminates the second control interval when a time measured by the second timer exceeds the second predetermined upper limit. Alternatively, it is preferred that the controller device comprises: a timer for measuring a time starting at a beginning of the first control interval; wherein the first shift control means terminates the first control interval when a time measured by the timer exceeds the first predetermined upper limit, and the second shift control means terminates the second control interval when a time measured by the timer exceeds a sum of the first and second predetermined upper limits.

Preferably the first shift control means controls the actuator means in accordance with a predetermined pattern such that the friction element is engaged with a predetermined amount of slip at the actual start of the gear shifting operation, and the second shift control means controls the actuator means in accordance with a feedback control such that a rate of change of the rotational speed of the input shaft of the automatic transmission is controlled to a predetermined target level.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

In the drawings, like reference numerals represent like or corresponding parts or portions.

DETAILED DESCRIPTION OF THE PREFERRED EMBODIMENTS

Referring now to the accompanying drawings, the preferred embodiments of this invention are described.

Figure 1:
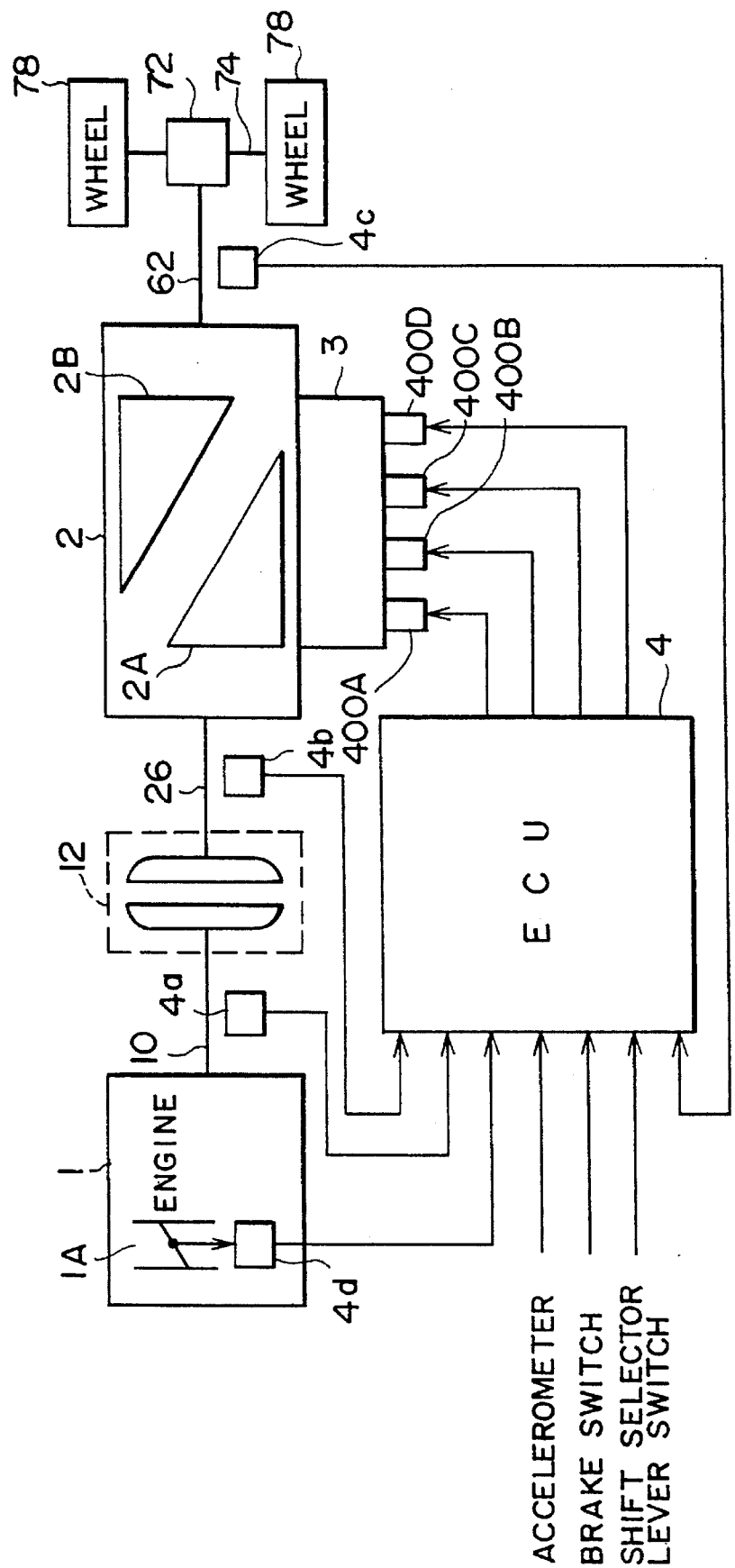
FIG. 1 is a block diagram showing the overall structure of a controller for an automatic transmission of an automotive vehicle according to this invention.

FIG. 1 is a block diagram showing the overall structure of a controller for an automatic transmission of an automotive vehicle according to this invention. The system includes an engine 1, a transmission 2 controlled by an oil pressure controller 3, and an electronic control unit 4. The crankshaft of the engine 1 is coupled to a drive shaft 10. The torque of the drive shaft 10 is increased by a torque converter 12 and thence transmitted to the transmission 2. The transmission 2 includes oil-pressure driven type friction elements 2A and speed change gears 2B. In accordance with the driving condition of the vehicle, the electronic control unit 4 outputs control signals to solenoid valves 400A, 400B, 400C and 400D, and thereby switches the operational combination of the oil-pressure driven type friction elements 2A and the speed change gears 2B, as described below, such that the desired gear ratio (rotational speed conversion) is realized by the transmission 2. The rotation of the output shaft 62 of the transmission 2 is transmitted through a differential gear 72 and a drive wheel axle 74 to a pair of drive wheels 78 of the vehicle.

Input to the electronic control unit 4 are: the output signal from a throttle position sensor 4d for detecting the opening degree of the throttle valve 1A of the engine 1; the output signal from an engine crankshaft speed sensor 4a; the output signals from an input shaft speed sensor 4b and an output shaft speed sensor 4c of the transmission 2; the output signal of an accelerometer (not shown) for detecting the forward and backward acceleration of the vehicle; the output signal of a brake switch (not shown) for detecting the driver's operation of the brake pedal (not shown) or the hand brake (not shown); and the output signal of a shift selector lever switch (not shown). On the basis of these signals, the electronic control unit 4 detects the driving state of the vehicle and controls the transmission 2 by means of the oil pressure controller 3, such that the gear ratio of the transmission 2 is controlled in accordance with the driving condition of the vehicle.

Figure 2:
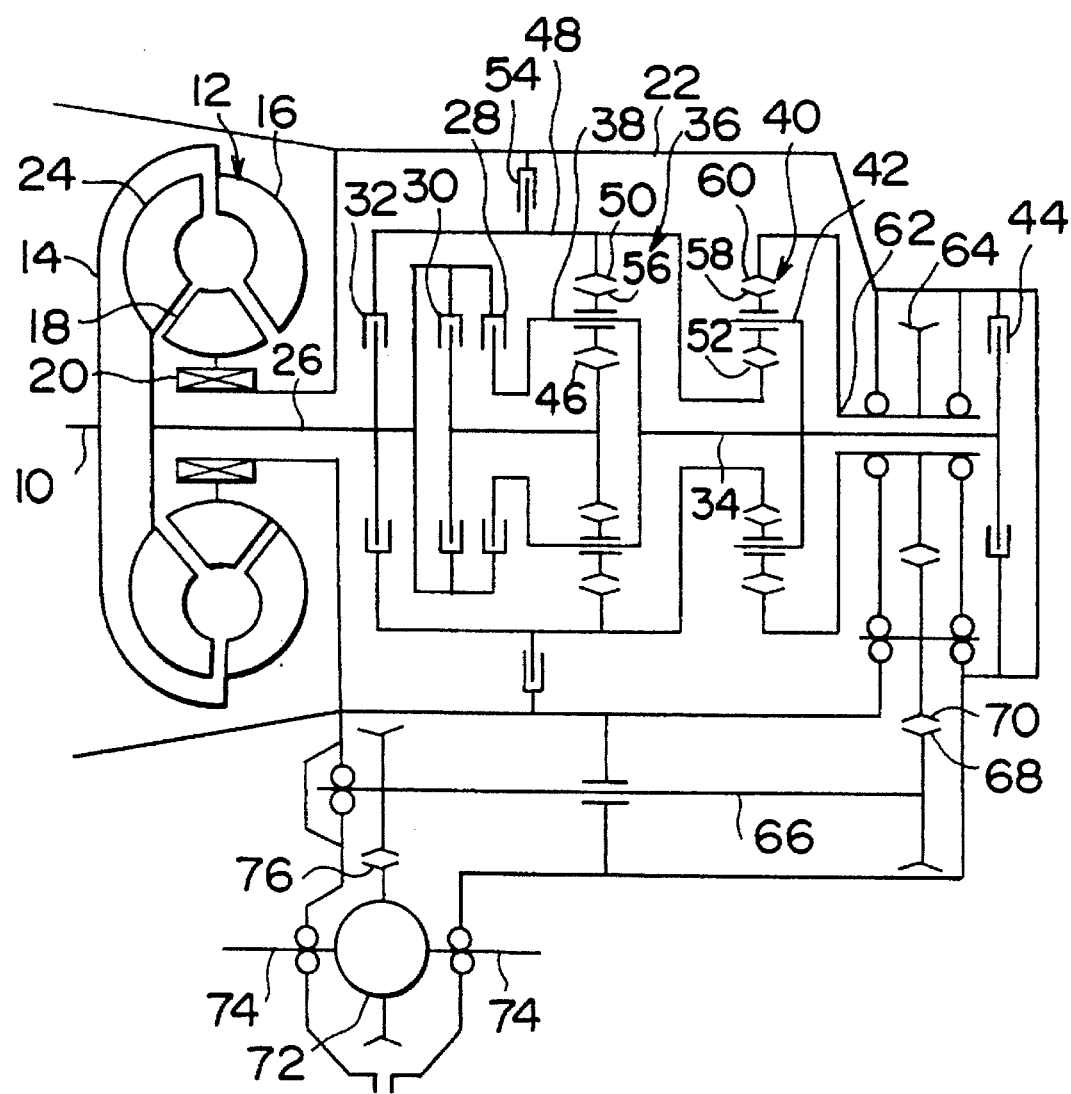
FIG. 2 is a diagram showing the structure of the transmission 2 of FIG. 1, which is capable of four forward gear ratios and one reverse gear combination.

FIG. 2 is a diagram showing the structure of the transmission 2 of FIG. 1, which is capable of four forward gear ratios and one reverse gear combination. First, the overall structure of the transmission 2 is described.

At the downstream side of the torque converter 12 is disposed coaxially the main portion of the transmission 2. The oil-pressure driven type friction elements 2A of the transmission 2 include: an over-drive clutch (OD clutch) 28, an under-drive clutch (UD clutch) 30, a reverse clutch (R clutch) 32, a low and reverse brake (L&R brake) 44, and a two/four gear ratio brake (2-4 brake) 54, which are engaged or disengaged by means of the oil pressure controller 3, such that the rotation of the output shaft 26 of the torque converter 12 is transmitted through the elements (in various combinations) of a first planetary gear system 36 and a second planetary gear system 40 to the output toothed wheel 64 at the desired gear ratio. The rotation of the output toothed wheel 64 is transmitted to the parallel-running intermediate transmission shaft 66 (shown at the lower side of the main transmission in FIG. 2) through an idler 70 and a toothed wheel 68 at the end of the intermediate transmission shaft 66, and thence to the drive wheel axle 74 through reduction gears 76, and a differential gear 72.

Next, the detailed structure of the torque converter 12 and the transmission 2 is described by reference to FIG. 2.

The drive shaft 10 coupled directly to the crankshaft of the engine 1 is coupled through an input casing 14 to a pump 16 of the torque converter 12. A stator 18 of the torque converter 12 is coupled to the transmission casing 22 through a one-way clutch 20. On the other hand, the turbine 24 driven by the work oil supplied from the pump 16 is coupled to the input shaft 26 of the transmission 2.

The input shaft 26 of the transmission 2 is secured to the inner (i.e., input) part of the reverse clutch (R clutch) 32 and the outer (i.e., input) parts of the under-drive clutch (UD clutch) 30 and the over-drive clutch 28. The outer (i.e., output) part of the reverse clutch 32 is secured to a second intermediate shaft (hollow expanded shaft) 48 enclosing the over-drive clutch 28, the under-drive clutch 30, and the first planetary gear system 36 therein. The inner (i.e., output) part of the under-drive clutch 30 is secured to the first sun gear 46 of the first planetary gear system 36. The inner (i.e., output) part of the over-drive clutch 28 is secured to the first carrier 38 of the first planetary gear system 36. The input and the output parts of the over-drive clutch 28, the under-drive clutch 30, and the under-drive clutch 30 engage and disengage to selectively transmit the torque therethrough.

The first planetary gear system 36 includes: a first sun gear 46, a pair of first pinion gears 56; the first carrier 38; and a first ring gear 50. The upstream end of the first carrier 38 forms the output part of the over-drive clutch 28. The downstream end of the first carrier 38 is secured to the first intermediate shaft 34. The first pinion gears 56 rotatably supported by the first carrier 38 engage with the first sun gear 46 and the first ring gear 50 to be rotatable therebetween. The first ring gear 50 is secured to the second intermediate shaft 48. When engaged, the two/four gear ratio brake 54 disposed on the interior side of the transmission casing 22 stops the rotation of the second intermediate shaft 48.

The second planetary gear system 40 includes a second sun gear 52, a pair of second pinion gears 58, a second carrier 42, and a second ring gear 60. The second sun gear 52 is secured to the second intermediate shaft 48. The second pinion gears 58 engage with the second sun gear 52 and the second ring gear 60 to be rotatable therebetween. The second carrier 42, rotatably supporting the second pinion gears 58, is secured to the first intermediate shaft 34. The second ring gear 60 is secured to the hollow output shaft 62 rotatably supported by the transmission casing 22.

Further, the output toothed wheel 64 of the main part of the transmission 2 is secured to the output shaft 62. When engaged, the low and reverse brake 44 disposed on the interior side wall of the transmission casing 22 (at the right end in FIG. 2) stops the rotation of the first intermediate shaft 34.

The output toothed wheel 64 of the main part of the transmission 2 engages with the idler 70 rotatably supported by the transmission casing 22. Further, the idler 70 engages with the toothed wheel 68 secured to the upstream end of the intermediate transmission shaft 66 rotatably supported by the underside part of the transmission casing 22. The rotation of the intermediate transmission shaft 66 is transmitted to the differential gear 72 through the reduction gears 76, and thence to the drive wheel axle 74 carrying the drive wheels 78.

The clutches 28, 30 and 32, and the brakes 44 and 54 are selectively engaged and disengaged by the oil pressure supplied selectively thereto by means of the oil pressure controller 3, as described in detail below. Four forward and one reverse gear ratios are realized by the combination of the operation states of the respective clutches and the brakes. The following table 1 summarizes the operation states of the respective clutches and the brakes for respective gear ratios.

TABLE 1

| friction elements | gear ratio | | | | |
|---|---|---|---|---|---|
| | 1st | 2nd | 3rd | 4th | reverse |
| L&R brake (44) | ○ | — | — | — | ○ |
| 2-4 brake (54) | — | ○ | — | ○ | — |
| UD clutch (30) | ○ | ○ | ○ | — | — |
| OD clutch (28) | — | — | ○ | ○ | — |
| R clutch (32) | — | — | — | — | ○ |

In the above table 1, a circle (○) represents the engaged state of the friction elements (the low and reverse brake 44, the two/four gear ratio brake 54, the under-drive clutch 30, the over-drive clutch 28, and the reverse clutch 32) and a minus sign (−) represents the disengaged state thereof.

As shown in table 1, the first forward gear ratio is realized by the engagements of the low and reverse brake 44 and the under-drive clutch 30. The two/four gear ratio brake 54, the over-drive clutch 28, and the reverse clutch (R clutch) 32 are disengaged. The operation of elements for realizing the first gear ratio is as follows.

By the engagement of the low and reverse brake 44, the rotation of the first intermediate shaft 34 is stopped and hence the first carrier 38 and the second carrier 42 are held stationary. The first carrier 38 and the second carrier 42 thus constitute reaction elements (i.e., the stationary elements from which the moving elements receive the reaction). Further, by the engagement of the under-drive clutch 30, the torque of the torque converter 12 is transmitted through the input shaft 26, the under-drive clutch 30 (which is engaged), the first sun gear 46, the first pinion gears 56 (rotating upon the fixed first carrier 38), the first ring gear 50, the second sun gear 52, the second pinion gears 58 (rotating upon the fixed second carrier 42), and the second ring gear 60, to the output shaft 62. The torque of the output shaft 62 is further transmitted through the output toothed wheel 64, the idler 70, the toothed wheel 68, the intermediate transmission shaft 66, the reduction gears 76, and the differential gear 72, to the drive wheel axle 74.

To shift into second from the first gear ratio, the low and reverse brake 44 is disengaged and the two/four gear ratio brake 54 is engaged instead thereof. The under-drive clutch 30 remains in the engaged state. By the engagement of the two/four gear ratio brake 54, the rotation of the first carrier 38 is stopped, and hence the first ring gear 50 and the second sun gear 52 are held stationary. The first ring gear 50 and the second sun gear 52 thus constitute reaction elements. The torque from the torque converter 12 is thus transmitted through the input shaft 26, the under-drive clutch 30, the first sun gear 46, the first pinion gears 56 (rolling within the fixed first ring gear 50), the first carrier 38, the first intermediate shaft 34, the second carrier 42, the second pinion gears 58 (rolling upon the fixed second sun gear 52), and the second ring gear 60 to the output shaft 62.

To shift into third from the second gear ratio, the two/four gear ratio brake 54 is disengaged while the over-drive clutch 28 is engaged. The under-drive clutch 30 remains in the engagement. By the simultaneous engagements of the over-drive clutch 28 and the under-drive clutch 30, the first sun gear 46 and the first carrier 38 are rotated together as an integral body. Further, the second carrier 42 is secured to the first carrier 38 through the first intermediate shaft 34, and the second sun gear 52 is secured to the first ring gear 50 through the 48. Thus, the second planetary gear system 40 is also rotated integrally as a whole. As a result, the input shaft 26 and the output shaft 62 are rotated at the same speed, thereby realizing the third gear ratio.

To shift into fourth from the third gear ratio, the under-drive clutch 30 is disengaged while the two/four gear ratio brake 54 is engaged. The over-drive clutch 28 remains in the engaged state. By the engagement of the two/four gear ratio brake 54, the rotations of the the first ring gear 50 and the second sun gear 52 are stopped. The first ring gear 50 and the second sun gear 52 thus constitute reaction elements. The torque from the torque converter 12 is transmitted through the input shaft 26, the over-drive clutch 28, the first carrier 38, the first intermediate shaft 34, the first carrier 38, the second carrier 42, the second pinion gears 58, and the second ring gear 60, to the output shaft 62. The second pinion gears 58 rolls upon the fixed second sun gear 52, such that the second ring gear 60 rotates faster than the second carrier 42 carrying the second pinion gears 58. Consequently, in the fourth gear ratio, the rotation of the output shaft 62 is faster than that of the input shaft 26.

To shift into the reverse gear combination, the low and reverse brake 44 and the reverse clutch 32 are engaged. The two/four gear ratio brake 54, the under-drive clutch 30, and the over-drive clutch 28 are disengaged. By the engagement of the low and reverse brake 44, the first carrier 38 and the second carrier 42 are held stationary. The first carrier 38 and the second carrier 42 thereby constitute reaction elements. By the engagement of the reverse clutch 32, the torque from the torque converter 12 is transmitted through the input shaft 26, the reverse clutch 32, the second intermediate shaft 48, the second sun gear 52, the second pinion gears 58 (rotating upon the fixed second carrier 42), and the second ring gear 60 to the output shaft 62. The gear train consisting of the second sun gear 52, the second pinion gears 58, and the second ring gear 60 reverses the direction of rotation. Thus, the output shaft 62 is rotated in the reverse direction with respect to the input shaft 26.

Figure 3:
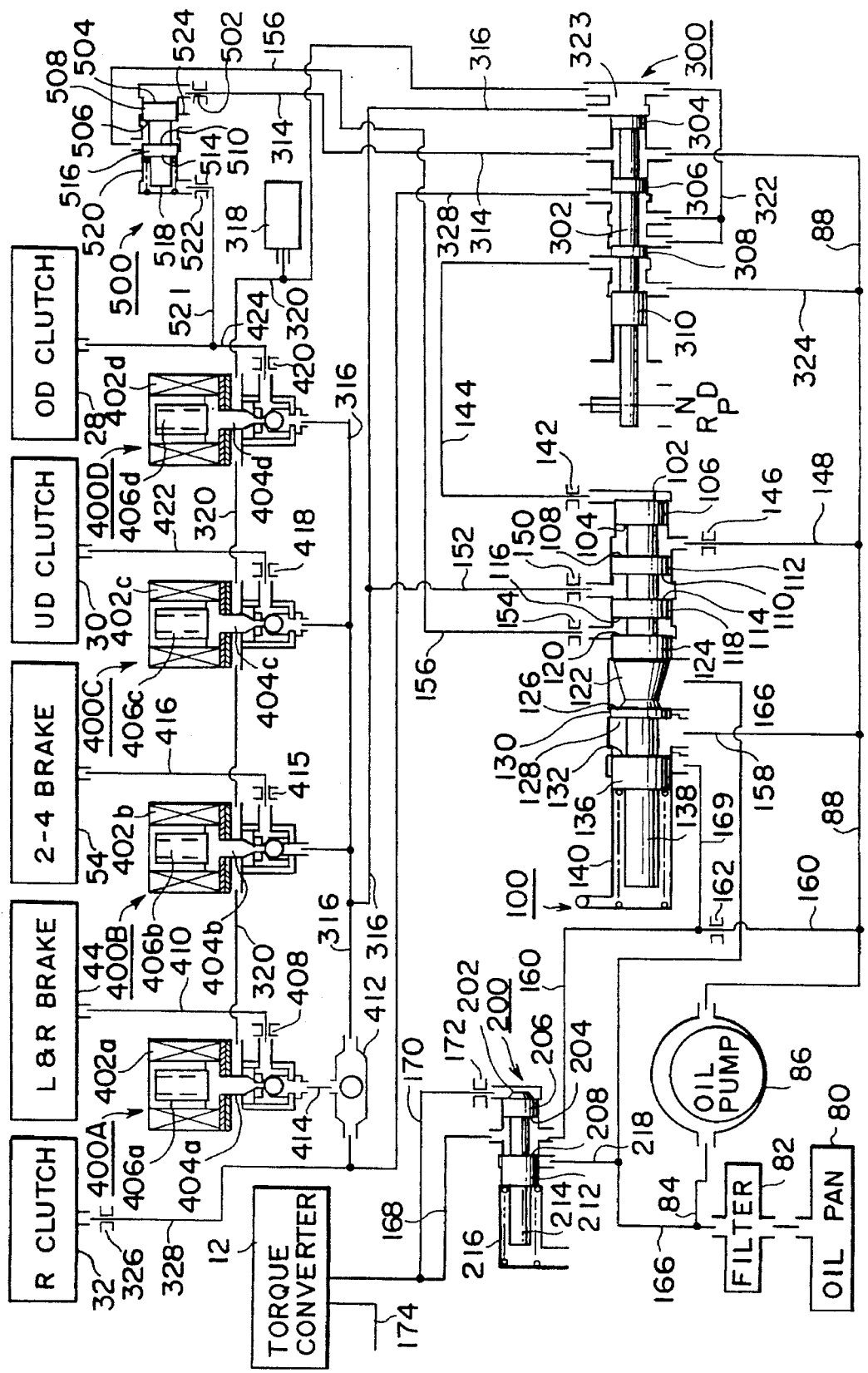
FIG. 3 is a diagram showing the oil pressure controller 3 of FIG. 1.

FIG. 3 is a diagram showing the oil pressure controller 3 of FIG. 1. The engagement and disengagement of the friction elements (the low and reverse brake 44, the two/four gear ratio brake 54, the under-drive clutch 30, the over-drive clutch 28 and the reverse clutch 32) shown in table 1 are controlled by the oil pressure controller whose detailed structure is shown in FIG. 3. Next the structure of the oil pressure controller is described by reference to FIG. 3.

The oil contained in an oil pan 80 is sucked up by an oil pump 86 through a filter 82 and an line 84 and supplied to the torque converter 12, the reverse clutch 32, the low and reverse brake 44, the two/four gear ratio brake 54, the under-drive clutch 30, and the over-drive clutch 28. The main components of the oil pressure controller are: a pressure-regulating valve 100, a torque converter control valve 200, a manual valve 300, an L&R solenoid valve 400A, a 2-4 solenoid valve 400B, an UD solenoid valve 400C, an OD solenoid valve 400D, and a line pressure change-over valve 500.

The pressure-regulating valve 100 regulates the oil pressure of the main supply line 88 directly supplied from the oil pump 86. The pressure-regulating valve 100 includes a spool 138 having: a land 106 with a pressure-receiving surface 102 and a pressure-receiving surface 104; a land 112 with a pressure-receiving surface 108 (opposing the pressure-receiving surface 104) and a pressure-receiving surface 110; a land 118 with a pressure-receiving surface 114 (opposing the pressure-receiving surface 110) and a pressure-receiving surface 116; a land 124 with a pressure-receiving surface 120 (opposing the pressure-receiving surface 116) and a pressure-receiving surface 122; a land 130 with a pressure-receiving surface 126 (substantially opposing the pressure-receiving surface 122) and a pressure-receiving surface 128; and a land 136 with a pressure-receiving surface 132 (opposing the pressure-receiving surface 128). A spring 140 bears upon the land 136 to urge the spool 138 toward the right in FIG. 3.

The pressure-receiving surface 108 has a pressure-receiving area greater than the pressure-receiving surface 104. The pressure-receiving surface 114 has a pressure-receiving area greater than the pressure-receiving surface 110. The pressure-receiving surface 120 has a pressure-receiving area greater than the pressure-receiving surface 116. The pressure-receiving surfaces 122, 126, 128, and 132 have the same effective pressure-receiving area. The space at the right of pressure-receiving surface 102 communicates with the line 144 provided with an orifice 142. The space between the pressure-receiving surfaces 110 and 114 communicates with a line 152 provided with an orifice 150. The space between the pressure-receiving surfaces 116 and 120 communicates with a line 156 provided with an orifice 154. The space between the lands 130 and 136 communicates with the main supply line 88 through a line 158, the main supply line 88 communicating with a line 160 having an orifice 162. A line 169 communicates with line 160 at the downstream side of the orifice 162. The space between the lands 130 and 124 communicates through a line 166 with a line 84 returning to the oil pump 86. The space between the pressure-receiving surfaces 104 and 108 communicates with the main supply line 88 through a line 148 having an orifice 146.

The torque converter control valve 200 includes a spool 214 having: a land 206 with pressure-receiving surfaces 202 and 204; and a land 212 with a pressure-receiving surface 208 opposing and having the same pressure-receiving area as the pressure-receiving surface 204. A spring 216 bears upon the land 212 to urge the spool 214 toward the right in FIG. 3.

The oil pressure regulated by the pressure-regulating valve 100 is supplied to the space at the right of the pressure-receiving surface 202, through the line 160, the space between the lands 206 and 212, the line 168 and an orifice 172, such that the oil pressure acting upon the pressure-receiving surface 202 balances with the urge exerted upon the spool 214 by the spring 216. The oil pressure of the line 168 is thus regulated to a predetermined level and is supplied to the torque converter 12. The oil returned from the torque converter 12 is supplied through a line 174 to the lubricating system of the transmission. When the oil pressure of the main supply line 88 and the lines connected thereto increases above a predetermined level, the spool 214 of the torque converter control valve 200 moves toward left in FIG. 3 against the urge of the spring 216, such that the space between the lands 206 and 212 communicates with the line 218 coupled to the return line 166. As a result, part of the oil pressure is released, and the oil pressure of the main supply line 88 returns to the predetermined level.

The manual valve 300 includes a spool 302 having lands 304, 306, 308, and 310. The spool 302 is mechanically or electrically coupled to a shift selector lever (not shown) which is disposed within the passenger room of the vehicle for such that the driver of the vehicle may operate it to a desired position. The positions of the selector lever includes: the P-position for the parking of the vehicle; the R-position for reverse or backward movement of the vehicle; the N-position for the neutral position of the transmission; a D4-position at which the gear ratio of the transmission may be selected from the first through fourth forward gear ratios; a D3-position at which the gear ratio may be selected from the first through third forward gear ratios; a D2-position at which the gear ratio may be selected from the first and the second forward gear ratios; and the L-position at which the gear ratios above the first (i.e., the second through fourth gear ratios) are prohibited.

When the selector lever is set at D4-, D3-, D2- or L-position, the spool 302 moves to the D-position, at which the main supply line 88 from the oil pump 86 communicates through the space between the lands 304 and 306 with a line 314 and a supply line 316 (which communicates with the solenoid valves 400A, 400B, 400C and 400D). Further, when the manual valve 300 is at the D-position, a line 144 communicates with a exit line 320 (communicating with a exit port 318), through: the space between the lands 308 and 310; the line 322; and a pressure room 323 at the right of the land 304. Under this circumstance, the L&R solenoid valve 400A, the 2-4 solenoid valve 400B, the UD solenoid valve 400C, and the OD solenoid valve 400D are turned on and off in response to the control signals from the electronic control unit 4 as described below, such that the optimum forward gear ratio in accordance with the selected position of the selector lever and the driving condition of the vehicle is selected.

When the selector lever is set at P- or N-position, the spool 302 moves to the N/P-position as shown in FIG. 3, at which the main supply line 88 communicates with the line 144 through the line 324 and the space between the lands 308 and the 310. Further, the main supply line 88 communicates with the line 314 through the space between the lands 304 and 306 of the spool 302. Furthermore, a supply line 328 having an orifice 326 and coupled to the reverse clutch (R clutch) 32 communicates with the exit line 320 through the space between the lands 306 and 308, the line 322, and the pressure room 323. Further, the supply line 316 communicates with the exit line 320 through the pressure room 323. Thus the neutral state of the transmission is realized.

When the selector lever is set at the R-position, the spool 302 moves to the R-position shown in FIG. 3. The main supply line 88 communicates with the lines 314 and 328 through the space between the lands 304 and 306 of the spool 302. Further, the line 144 communicates with the exit line 320 through the space between the lands 306 and 308, the line 322 and the pressure room 323. Furthermore, the supply line 316 communicates with the exit line 320. The reverse clutch (R clutch) 32 is engaged by the oil pressure supplied through the supply line 328. The transmission 2 is thus controlled to the reverse or backward gear combination.

The L&R solenoid valve 400A is a normally open type three-way valve operating in response to the control signal from the electronic control unit 4. The L&R solenoid valve 400A includes a solenoid coil 402a, a valve body 404a, and a spring 406a. The spring 406a urges the valve body 404a to open the valve. When the solenoid coil 402a is not excited, the valve body 404a interrupts the communication of the exit line 320 with a L&R brake line 410, which has an orifice 408 and is coupled to the low and reverse brake (L&R brake) 44. At the same time, the L&R brake line 410 communicates with a supply line 414 to which the oil pressure of the supply line 316 or the supply line 328 is supplied through a check valve 412. On the other hand, when the solenoid coil 402a is excited, the valve body 404a interrupts the communication of the L&R brake line 410 with the supply line 414. At the same time, the L&R brake line 410 communicates with the exit line 320.

The 2-4 solenoid valve 400B is a normally closed type three-way valve. The 2-4 solenoid valve 400B includes a solenoid coil 402b, a valve body 404b, and a spring 406b. The spring 406b urges the valve body 404b to close the valve. When the solenoid coil 402b is not excited, the valve body 404b interrupts the communication of the supply line 316 with an 2-4 brake line 416, which has an orifice 415 and is coupled to the two/four gear ratio brake (2-4 brake) 54. At the same time, the 2-4 brake line 416 communicates with the exit line 320. On the other hand, when the solenoid coil 402b is excited, the valve body 404b interrupts the communication of the exit line 320 with the 2-4 brake line 416. At the same time, the 2-4 brake line 416 communicates with the supply line 316.

The UD solenoid valve 400C and OD solenoid valve 400D are normally open type three-way valves as the L&R solenoid valve 400A. The UD solenoid valve 400C include a solenoid coil 402c, a valve body 404c, and a spring 406c. The OD solenoid valve 400D include a solenoid coil 402d, a valve body 404d, and a spring 406d. The springs 406c and 406d urge the valve body 404c and 404d, respectively, to open the valve. When the solenoid coils 402c and 402d are not excited, the valve bodies 404b and 404c interrupt the communication of the exit line 320 with the individual lines 422 and 424, respectively, which have orifices 418 and 420 and are coupled to the under-drive clutch 30 and the over-drive clutch 28, respectively. At the same time, the individual lines 422 and 424 are communicated with the supply line 316. On the other hand, when the solenoid coils 402c and 402d are excited, the valve bodies 404c and 404d interrupt the communication of the exit line 320 with the lines 422 and 424, respectively. At the same time, the lines 422 and 424 communicate with the supply line 316.

The following table 2 shows the relationship between the gear ratios of the transmission 2 and the combinations of the ON and OFF states (i.e., the excited and unexcited states) of the solenoid valves 400A, 400B, 400C, and 400D. In the table, the minus sign (−) represents an arbitrary state.

TABLE 2

| gear ratios | L&R valve | 2-4 valve | UD valve | OD valve |
|---|---|---|---|---|
| 1st | OFF | OFF | OFF | ON |
| 2nd | ON | ON | OFF | ON |
| 3rd | ON | OFF | OFF | OFF |
| 4th | ON | ON | ON | OFF |
| reverse | OFF | — | — | — |

The line pressure change-over valve 500 changes over the line pressure to a level corresponding to the gear ratio. The line pressure change-over valve 500 includes a spool 518 having: a land 508 with a pressure-receiving surface 504 (receiving the oil pressure of the line 314 having an orifice 502) and a pressure-receiving surface 506; and a land 516 with a pressure-receiving surface 510 (opposing and having the same pressure-receiving area as the pressure-receiving surface 506) and a pressure-receiving surface 514 (receiving the oil pressure of the OD clutch line 424 through the line having an orifice 522). A spring 520 bearing upon the pressure-receiving surface 514 urges the spool 518 toward the right in FIG. 3.

When the oil pressure is supplied to the line 314 and the OD clutch line 424 is not supplied with the oil pressure, the pressure acting upon the pressure-receiving surface 504 displaces the spool 518 toward left in FIG. 3 against the urging force of the spring 520. Thus, the line 156 communicates with the exit port 524 through the space between the lands 508 and 516. On the other hand, when neither the OD clutch line 424 nor the line 314 is supplied with the oil pressure, or when the oil pressure is supplied to the OD clutch line 424, the urging force of the spring 520 (together with the pressure acting upon the pressure-receiving surface 514 when the oil pressure is supplied to the OD clutch line 424) displaces the spool 518 toward right in FIG. 3. Thus, the line 156 communicates with the OD clutch line 424 through the oil pressure room at the left of the land 516.

Next, the operation of the oil pressure controller 3 is described. When the driver of the vehicle sets the selector lever at the P- or N-position, the spool 302 of the manual valve 300 coupled mechanically or electrically to the selector lever moves to the P/N position. When the engine is started, the oil pressure generated by the oil pump 86 is supplied to the main supply line 88 and thence to the lines communicating therewith. The oil pressure of the main supply line 88 acts upon the pressure-receiving surfaces 104 and 108 of the pressure-regulating valve 100 through the line 148. Further, the oil pressure of the main supply line 88 acts upon the pressure-receiving surface 102 of the pressure-regulating valve 100 through the line 324, the space between the lands 308 and 310 of the manual valve 300, and the line 144.

The spool 138 of the pressure-regulating valve 100 is stabilized at the position where the pressure acting upon the pressure-receiving surfaces and the urge of the spring 140 are balanced. A part of the oil pressure supplied through the line 158 to the space between the lands 130 and 136 is released to the lines 166 and 169. The oil pressure within the main supply line 88 is thus regulated to a lowest predetermined pressure (referred to as the first line pressure).

Further, the oil pressure of the lines 88 and 169 is supplied to the torque converter control valve 200 through the line 160, such that a predetermined pressure is supplied to the torque converter 12 through the line 168. Further, the oil pressure of the main supply line 88 is supplied to the oil pressure room at the right end of the line pressure change-over valve 500, through the space between the lands 304 and 306 of the spool 302 of the manual valve 300 and the line 314, and acts upon the pressure-receiving surface 504 to displace the spool 518 toward the left end position in FIG. 3 against the urge of the spring 520. The line 156 thus communicates with the exit line 320. The solenoid valves 400A, 400B, 400C, and 400D are retained in the OFF state.

It is assumed that the driver hereupon selects the D4-position. Then, the manual valve 300 is set to the D-position. The line 324 is interrupted by the land 310, and the line 144 communicates with the line 322. The oil pressure within the oil pressure room at the right end of the pressure-regulating valve 100 is released through the lines 322 and 320. Further, the main supply line 88 communicates with the supply line 316 through the space between the lands 304 and 306 of the manual valve 300, such that the oil pressure of the supply line 316 is supplied through the line 152 to the space between the lands 112 and 118 of the pressure-regulating valve 100.

The spool 138 is stabilized at the position where the forces acting upon the pressure-receiving surfaces 104, 108, 110 and 114 and the urge of the spring 140 are balanced. A part of the oil pressure of the line 158 is thus released through the lines 169 and 166. The oil pressure of the main supply line 88 is regulated to a relatively high predetermined pressure (e.g., 10 kgf/cm$^2$, which is referred to as the second line pressure). The oil pressure of the supply line 316 is supplied to the solenoid valves 400B, 400C, and 400D, and to the L&R solenoid valve 400A through the check valve 412 and the supply line 414. By the way, the line 314 is maintained in communication with the main supply line 88 as in the case of N/P position.

Further, when the selector lever is set at the D4-position, the electronic control unit 4 outputs the control signals to engage the low and reverse brake 44 and the under-drive clutch 30, thereby realizing the first forward gear ratio, as shown in table 1. Namely, the electronic control unit 4 outputs the control signals to the solenoid valves such that the solenoid valves 400A, 400B, and 400C remains in the unexcited state, while the OD solenoid valve 400D is excited. Only the L&R solenoid valve 400A and the UD solenoid valve 400C are thus rendered open, such that the supply line 414 communicates with the L&R brake line 410 and the supply line 316 communicates with the UD clutch line 422.

Next, the operation of the respective elements when the gear ratio is shifted up from the first to the second forward gear ratio is described. After the vehicle begins to run and gains speed, the electronic control unit 4 outputs the control signal to shift the transmission 2 to the second gear ratio in accordance with the throttle position signal and the vehicle speed signal, etc. Namely, in order to engage the two/four gear ratio brake 54 and the under-drive clutch 30 to realize the second gear ratio as shown in table 1, the electronic control unit 4 outputs the control signals to the solenoid valves, such that the L&R solenoid valve 400A, the 2-4 solenoid valve 400B and the OD solenoid valve 400D are excited while the UD solenoid valve 400C is unexcited.

The L&R solenoid valve 400A is thus switched from the unexcited to the excited state. As a result, the L&R brake line 410 communicates with the exit line 320, such that the oil pressure of the L&R brake line 410 is released and the low and reverse brake 44 is disengaged. The 2-4 solenoid valve 400B is switched from the unexcited to the excited state. As a result, the supply line 316 communicates with the 2-4 brake line 416, such that the oil pressure supplied to the 2-4 brake line 416 engages the two/four gear ratio brake 54. Further, the under-drive clutch 30 is retained in engagement, and the over-drive clutch 28 is retained in disengagement.

Other switching operations of the gear ratios are performed in a manner similar to the gear shifting operation from the first to the second gear ratio as described above, by selectively engaging and disengaging the low and reverse brake 44, the two/four gear ratio brake 54, the under-drive clutch 30, the over-drive clutch 28 and the reverse clutch 32 in accordance with table 1. The engagement and disengagement of the clutches and the brakes are effected by controlling the excited/unexcited states of the respective solenoid valves to realize the engagement/disengagement states in accordance with table 2.

Figure 4:
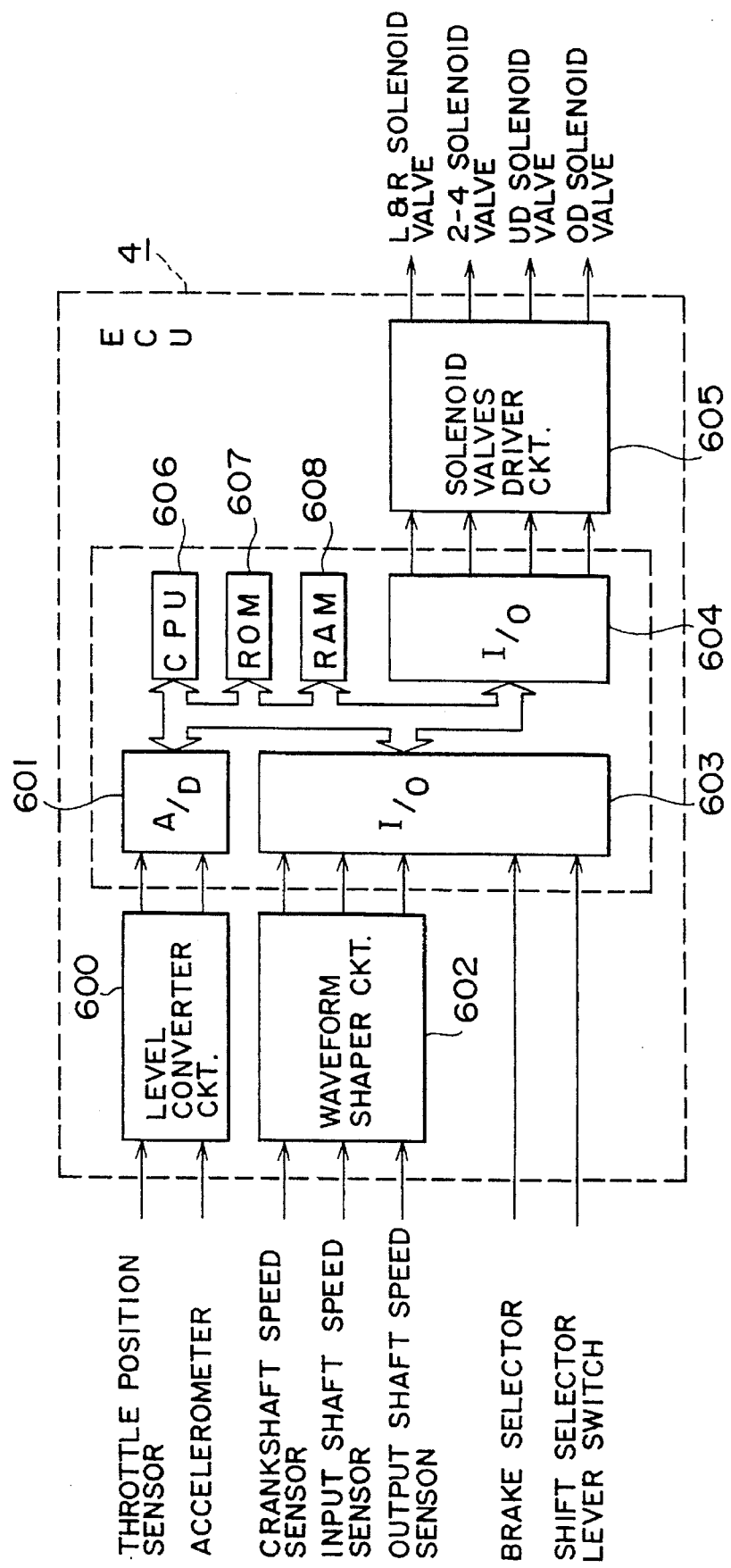
FIG. 4 is a block diagram showing the structure of the electronic control unit 4 of FIG. 1.

FIG. 4 is a block diagram showing the structure of the electronic control unit 4 of FIG. 1. The electronic control unit 4 includes: a level converter circuit 600 for converting the voltage level of the analog output signals from the throttle position sensor and the accelerometer (not shown), etc.; an A/D converter 601 for converting the analog signals (outputs from the level converter circuit 600) into corresponding digital signals; a waveform shaper circuit 602 for shaping the waveforms of the pulse signals from the electronic control unit 4, the input shaft speed sensor 4b, and the output shaft speed sensor 4c, etc.; input ports 603 for inputting digital output signals from the brake switch (not shown), the shift selector lever switch (not shown), and the waveform shaper circuit 602, etc.; output ports 604 for outputting the control signals to a solenoid valves driver circuit 605, etc.; a microprocessor (CPU) 606 for controlling the overall operations of the electronic control unit 4; a ROM 607 for storing the control programs and data, etc.; and a RAM 608 for storing the temporary data of the measurements and calculations. The microprocessor 606 determines the running condition of the vehicle on the basis of the signals received via the A/D converter 601 and the input ports 603, and, in accordance with the pro,rams stored in the ROM 607, outputs the control signals to the solenoid valves driver circuit 605 through the output ports 604, such that the the clutches and brakes of the transmission 2 are engaged and disengaged to realize the desired gear ratio. As described below, the duty factors of the L&R solenoid valve 400A, the 2-4 solenoid valve 400B, the UD solenoid valve 400C, and the 0D solenoid valve 400D are controlled by means of the solenoid valves driver circuit 605 during the gear shifting operation.

Next, as an example of the gear shifting operation, the operation for shifting the gear from the first to the second gear ratio is described. As described above the low and reverse brake 44 and the under-drive clutch 30 are engaged in the first gear ratio. When the engine 1 is being driven and the gear shifting operation from the first to the second gear ratio is effected with the power turned on, the shock of the gear shift must be minimized by the simultaneous partial disengagement of the low and reverse brake 44 and partial engagement the two/four gear ratio brake 54. The engagement and the disengagement of the friction elements are thus performed smoothly, minimizing the variation of the torque of the output shaft by controlling the duty factor of the L&R solenoid valve 400A and 2-4 solenoid valve 400B, thereby realizing the fine control of the oil pressures supplied to the low and reverse brake 44 and the two/four gear ratio brake 54.

Figure 5:
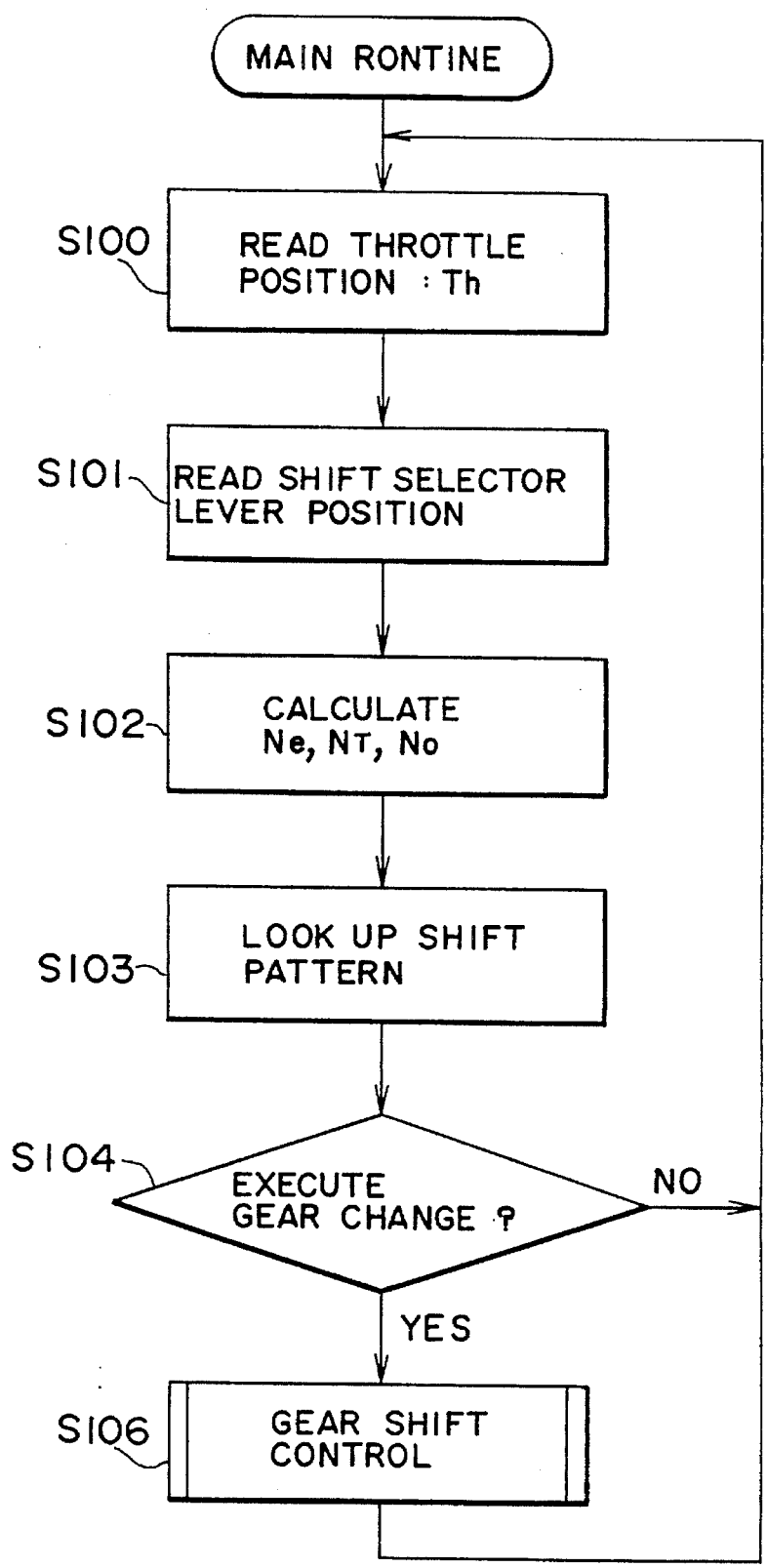
FIG. 5 is a flowchart showing a main routine followed by the electronic control unit 4 of FIG. 1.

Next the operation of the electronic control unit 4 is described by reference to FIGS. 5 and 6. FIG. 5 is a flowchart showing a main routine followed by the electronic control unit 4 of FIG. 1. At step S100 the throttle valve position (throttle opening degree) $T_h$ is read in from the throttle position sensor 4d. At step S101, the position of the shift selector lever is read in by means of the shift selector lever switch. At step S102, the rotational speed $N_e$ of the engine, the rotational speed $N_T$ of the input shaft of the transmission 2, and the rotational speed $N_o$ of the output shaft of the transmission 2 (corresponding to the velocity of the vehicle) are calculated on the basis of the output signals from the engine crankshaft speed sensor 4a, the input shaft speed sensor 4b, and the output shaft speed sensor 4c.

At step S103, the target gear ratio is determined by looking up the shift pattern map stored in the ROM 607. The shift pattern map is a table indicating the optimum gear ratio corresponding to the running condition of the vehicle as determined from the throttle position $T_h$ and the rotational speed $N_o$ of the output shaft of the transmission 2. The target gear ratio is determined by looking up the gear ratio corresponding to the current throttle position $T_h$ and the rotational speed $N_o$ of the output shaft. At step S104, it is judged whether or not the gear shifting operation is to be performed. Namely, the current gear ratio is determined by reading out the gear shift data of the previous gear shifting operation stored in the RAM 608, and the current gear ratio thus determined is compared with the target gear ratio determined at step S103. If the target and the current gear ratio disagree, it is judged that the gear shifting operation is to be performed. If the judgment is affirmative at step S104, the execution proceeds to step S106 where the gear shift control operation is performed. On the other hand, if the judgment is negative at step S104, the execution returns to step S100 to repeat the steps S100 through S104.

Figure 6:
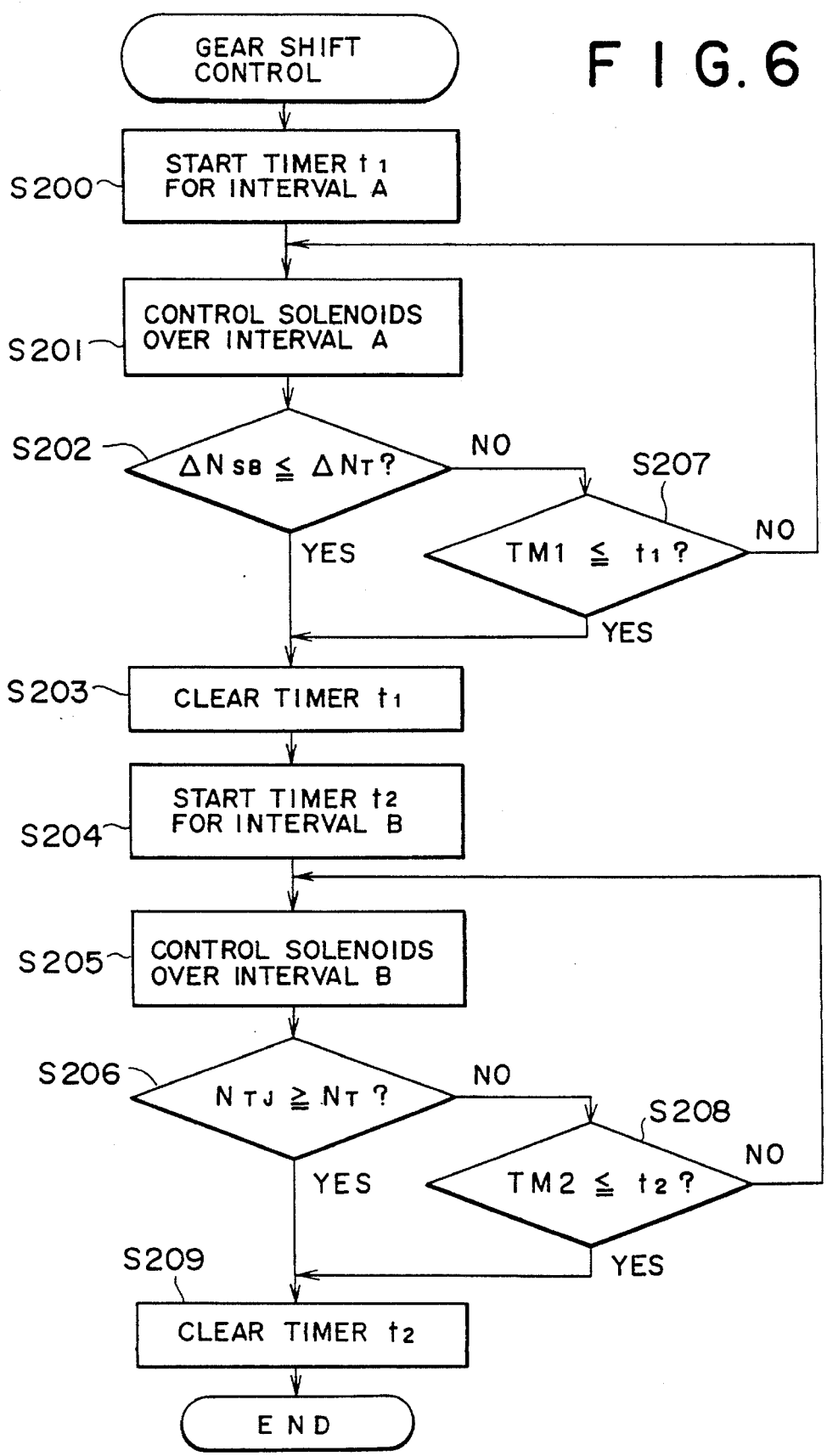
FIG. 6 is a flowchart showing a gear shifting operation control routine.
Figure 7:
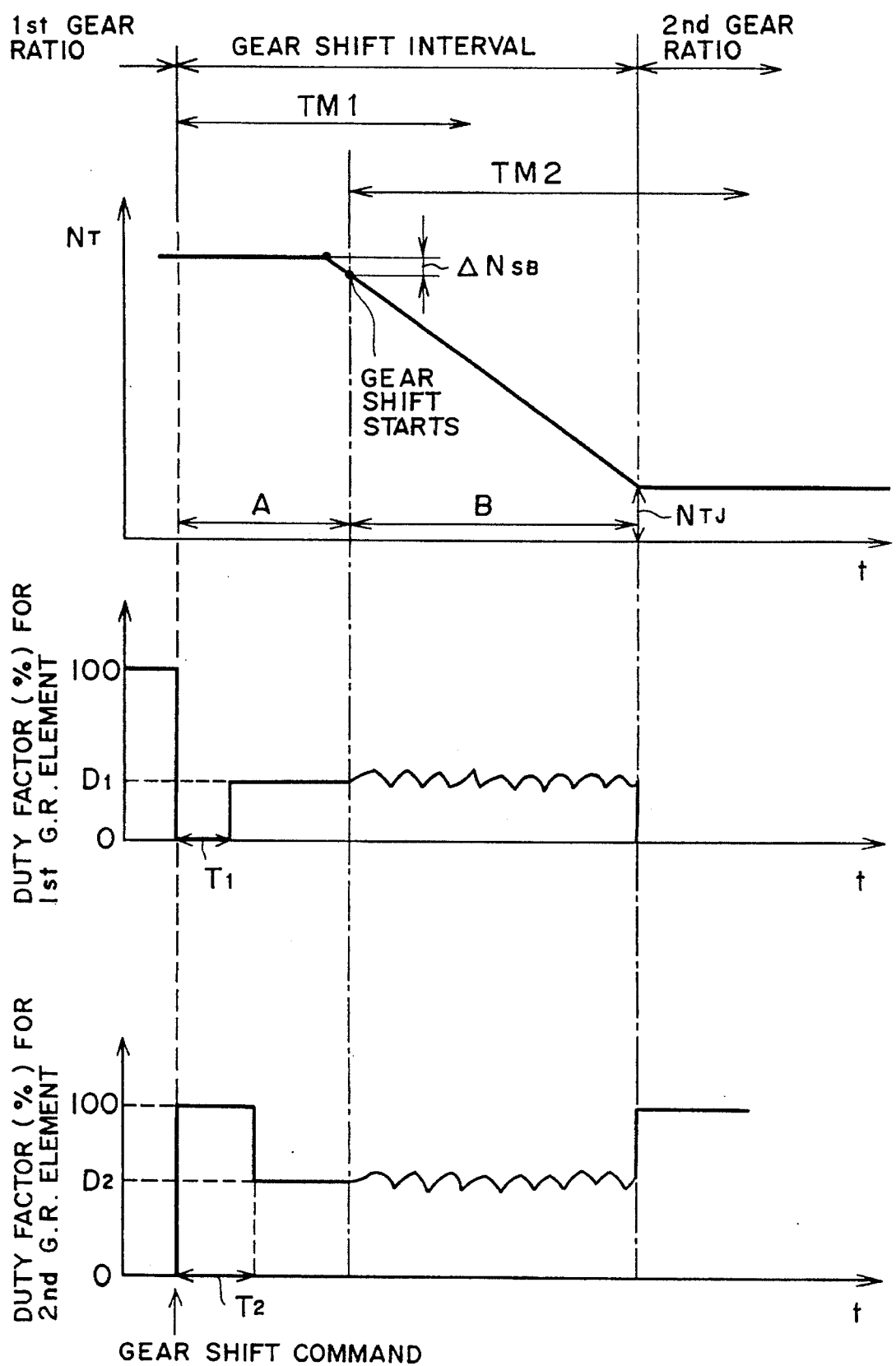
FIG. 7 is a timing chart associated with the routine of FIG. 6, showing the variation of the rotational speed $N_T$ of the input shaft of the transmission (the top curve) and the waveforms of the duty factors of the friction elements for the first and the second gear ratios (the middle and the bottom waveforms)
Figure 8:
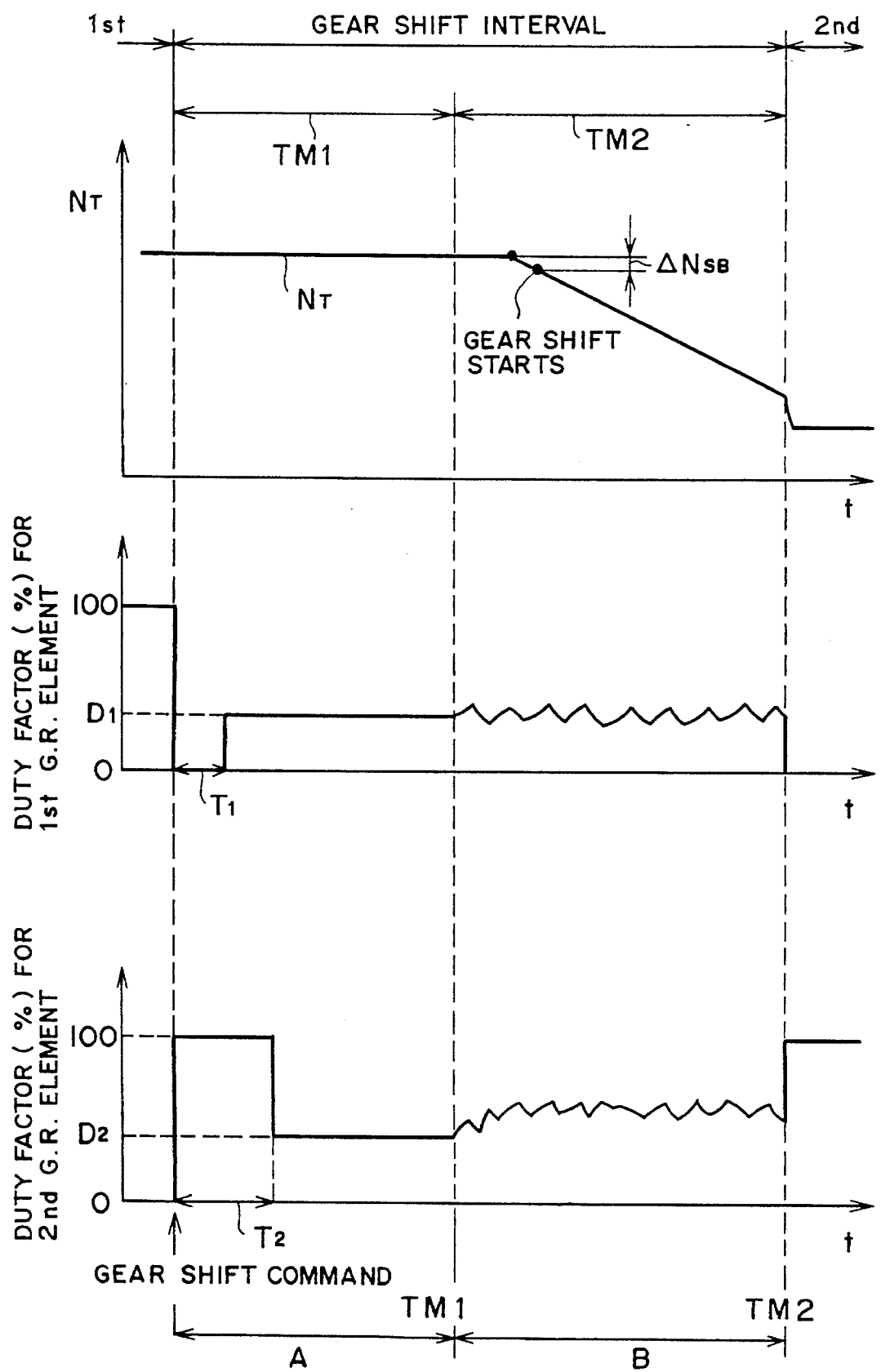
FIG. 8 is a timing chart similar to that of FIG. 7, but showing the waveforms in the case where the gear shifting operation is not terminated within a predetermined interval.

FIG. 6 is a flowchart showing a gear shifting operation control routine. FIG. 7 is a timing chart associated with the routine of FIG. 6, showing the variation of the rotational speed $N_T$ of input shaft of the transmission (the top curve) and the waveforms of the duty factors of the friction elements for the first and the second gear ratio (the middle and the bottom waveforms). FIG. 8 is a timing chart similar to that of FIG. 7, but showing the waveforms in the case where the gear shifting operation is not terminated within a predetermined interval. According to this embodiment, the gear shift control interval is divided into two intervals A and B. The interval A starts when the gear shift command is issued and ends when the actual gear shift begins (i.e., the rotational speed $N_T$ of the input shaft of the transmission 2 begins to change) or when a predetermined upper limit for the length of interval A expires. The interval B starts when the gear shift begins and ends when the gear shift is completed or when a predetermined upper limit for the length of interval B expires. In the intervals A and B, the duty factors of the friction elements are controlled in accordance with distinct control methods.

At step S200, a first timer $t_1$ for measuring the length of time from the beginning of interval A is started at the time when the gear shift command is issued. Thus, the timer $T_1$ measures the length of time beginning at the issuance of the gear shift command.

At step S201, the duty factors of the solenoid valves for the friction elements whose engagement/disengagement states are changed for effecting the gear shift are controlled in accordance with a predetermined pattern. Here, it is assumed that the gear ratio is changed from the first to the second gear ratio. Thus, the duty factor of the L&R solenoid valve 400A for the low and reverse brake 44 (the friction element for the first gear ratio) and the duty factor of the 2-4 solenoid valve 400B for the two/four gear ratio brake 54 (the friction element for the second gear ratio) are controlled as represented by the middle and bottom waveforms in FIGS. 7 and 8. Namely, the duty factor of the L&R solenoid valve 400A for the low and reverse brake 44 is reduced to zero percent for a first predetermined time length $T_1$, and then held at a first predetermined level $D_1$ between the zero and 100 percent. On the other hand, the duty factor of the 2-4 solenoid valve 400B for the low and reverse brake (L&R brake) 44 is raised to 100 percent for a second predetermined time length $T_2$, and then held at a second predetermined level $D_2$ between the zero and 100 percent. The reason for adapting these control pattern for the duty factors during the first control interval A is as follows.

The duty factor of the solenoid valves corresponds to the degree of engagement of the associated friction elements (the brakes and the clutches). Thus, if the duty factor of the L&R solenoid valve 400A is controlled to an intermediate level $D_1$ between zero and 100 percent, the low and reverse brake 44 is partially engaged with a certain amount of slip. Similarly, the 2-4 solenoid valve 400B may be controlled to an intermediate level $D_2$ between zero and 100 percent, such that the two/four gear ratio brake 54 is partially engaged with a certain amount of slip. The partial engagements of the low and reverse brake 44 and the two/four gear ratio brake 54 effectively minimize the shock of the gear shifting operation.

However, due to the strokes, etc., the solenoid valves take a certain length of time in responding to the change of the duty factor. Thus, even if the duty factors of the L&R solenoid valve 400A and 2-4 solenoid valve 400B are controlled to the levels $D_1$ and $D_2$, respectively, an appreciable length of time elapses before the degree of engagements of the low and reverse brake 44 and the two/four gear ratio brake 54 are adjusted to the levels corresponding to $D_1$ and $D_2$, respectively. The zero and 100 percent intervals $T_1$ and $T_2$ for the duty factors of the respective solenoid valves are provided for the purpose of minimizing the length of time from the issuance of the gear shift command to the actual beginning of the gear shift at which the rotational speed $N_T$ of the input shaft of the transmission 2 begins to decrease. The time lengths $T_1$ and $T_2$ are selected shorter than the response time of the respective solenoid valves, such that at the beginning of the actual gear shift, the respective friction elements engage with a predetermined amount of slip.

At step S202, it is judged whether or not the change (in this case the decrement) $\Delta N_T$ of the rotational speed $N_T$ of the input shaft over a predetermined short period of time is greater than or equal to a predetermined reference level $\Delta N_{SB}$. The affirmative judgement (i.e., $\Delta N_{SB} \leq \Delta N_T$) implies that the actual gear shift has begun. Thus, if the judgment is affirmative at step S202, the execution proceeds to step S203, where the first timer $t_1$ is cleared and, at step S204, the second timer $t_2$ for the interval B is started.

On the other hand, if the judgment is negative at step S202, the execution proceeds step S207, where it is judged whether or not the time t1 measured by the first timer is greater than or equal to a predetermined upper limit TM1 of the interval A. If the judgment is negative at step S207 (i.e., TM1>$t_1$), the execution returns to step S201 to continue the control operation for the interval A. The execution proceeds step S203 when either the judgment at step S202 or that at step S207 becomes affirmative. FIG. 7 shows the case where the execution proceeds from step S202 to step S203. FIG. 8 shows the case where the execution proceeds from step S207 to step S203.

At step S205, the solenoid valves (under this circumstance, the L&R solenoid valve 400A and the 2-4 solenoid valve 400B) for the friction elements involved in the gear shift are controlled in accordance with the control method for the interval B. Namely, a predetermined control variable is controlled to a predetermined target level by means of the feedback controller method. In the case of this embodiment, the rate of change of the rotational speed $N_T$ of the input shaft of the transmission 2 is controlled to a target level as the controlled variable. As described above, the duty factors of the L&R solenoid valve 400A and the 2-4 solenoid valve 400B are controlled to predetermined levels $D_1$ and $D_2$, respectively, at the beginning of the interval B. At step S205, the rate of change of the rotational speed $N_T$ is determined on the basis of the output signal from the input shaft speed sensor 4b, and is compared with a predetermined target level. The duty factors of the solenoid valves 400A and 400B are adjusted by the feedback control method, such that the rate of change of the rotational speed $N_T$ is controlled to the target level.

At step S206, it is judged whether or not the current rotational speed $N_T$ of the input shaft is less than or equal to a predetermined reference level $N_{TJ}$ of the rotational speed of the input shaft at the completion of the gear shifting operation. The affirmative judgment (i.e., $N_{TJ} \geq N_T$) implies that the gear shift has been completed. Thus, if the judgment is affirmative at step S206, the execution proceeds to step S209, where the second timer $t_2$ is cleared and the gear shift control routine of FIG. 6 is terminated. At the termination of the interval B, the duty factors of the L&R solenoid valve 400A and the 2-4 solenoid valve 400B are controlled to the final levels (i.e., zero percent and 100 percent) respectively. On the other hand, if the judgment is negative at step S206, the execution proceeds to step S208, where it is judged whether or not the time $t_2$ measured by the second timer is greater than or equal to a predetermined upper limit TM2 of the length of the interval B. If the judgment is negative at step S208, the execution returns to step S205 to continue the feedback control for the interval B. If the judgment is affirmative at step S208, the execution proceeds to step S209. FIG. 7 shows the waveforms where the execution proceeds from step S206 to step S209. FIG. 8 shows the waveforms where the execution proceeds from step S208 to step S209.

The gear shift control operation in accordance with the routine of FIG. 6 may be summarized as follows. The gear shift control interval is divided into two intervals A and B. During the interval A, the duty factors of the solenoid valves for the friction elements whose engagement/disengagement state are to be changed in the gear shift are controlled in accordance with predetermined patterns, such that the degrees of engagement of the friction elements are controlled to respective predetermined levels as quickly as possible. The interval A is terminated either when the predetermined upper limit TM1 for the length of the interval A expires, or when the rotational speed $N_T$ of the input shaft begins to change, indicating the actual start of the gear shift. When the interval A is terminated, the interval B begins and a feedback control of the duty factors of the solenoid valves for the friction elements is performed to control the control variable (e.g., the rate of change of the rotational speed $N_T$ of the input shaft of the transmission 2) to a target level. The interval B is terminated either when the upper limit TM2 for the length of interval B expires or when the gear shift is completed. After the interval B is terminated, the duty factors of the solenoid valves are controlled to the final levels. It is apparent to those skilled in the art that the above method for controlling the gear shift is applicable (with obvious modifications) to the cases where the gear ratio is shifted upward from the second to the third, from the third to the fourth, etc., or shifted downward from the fourth to the third, third to the second gear ratio, etc.

Figure 9:
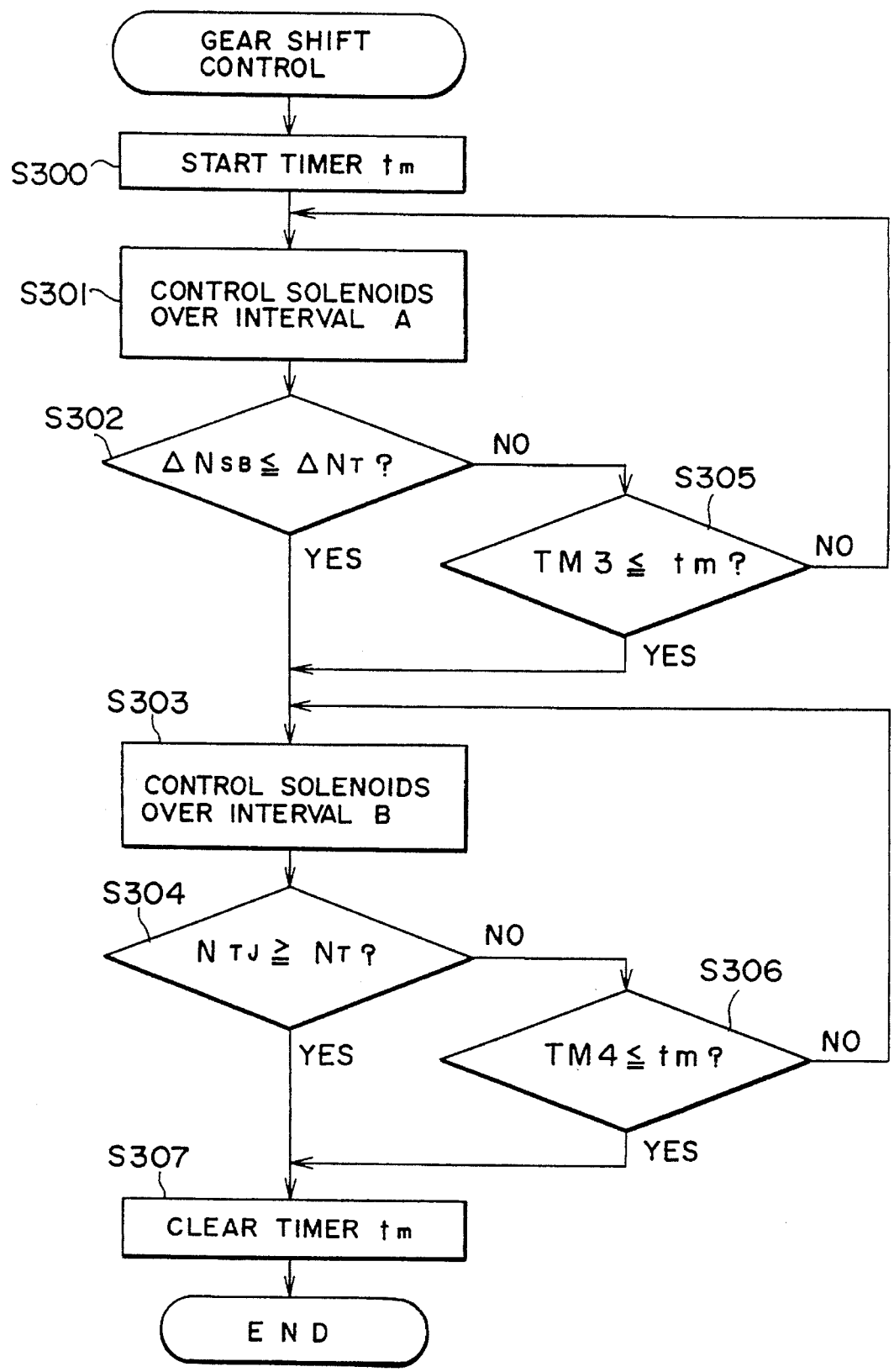
FIG. 9 is a flowchart showing an alternative gear shifting operation control routine.
Figure 10:
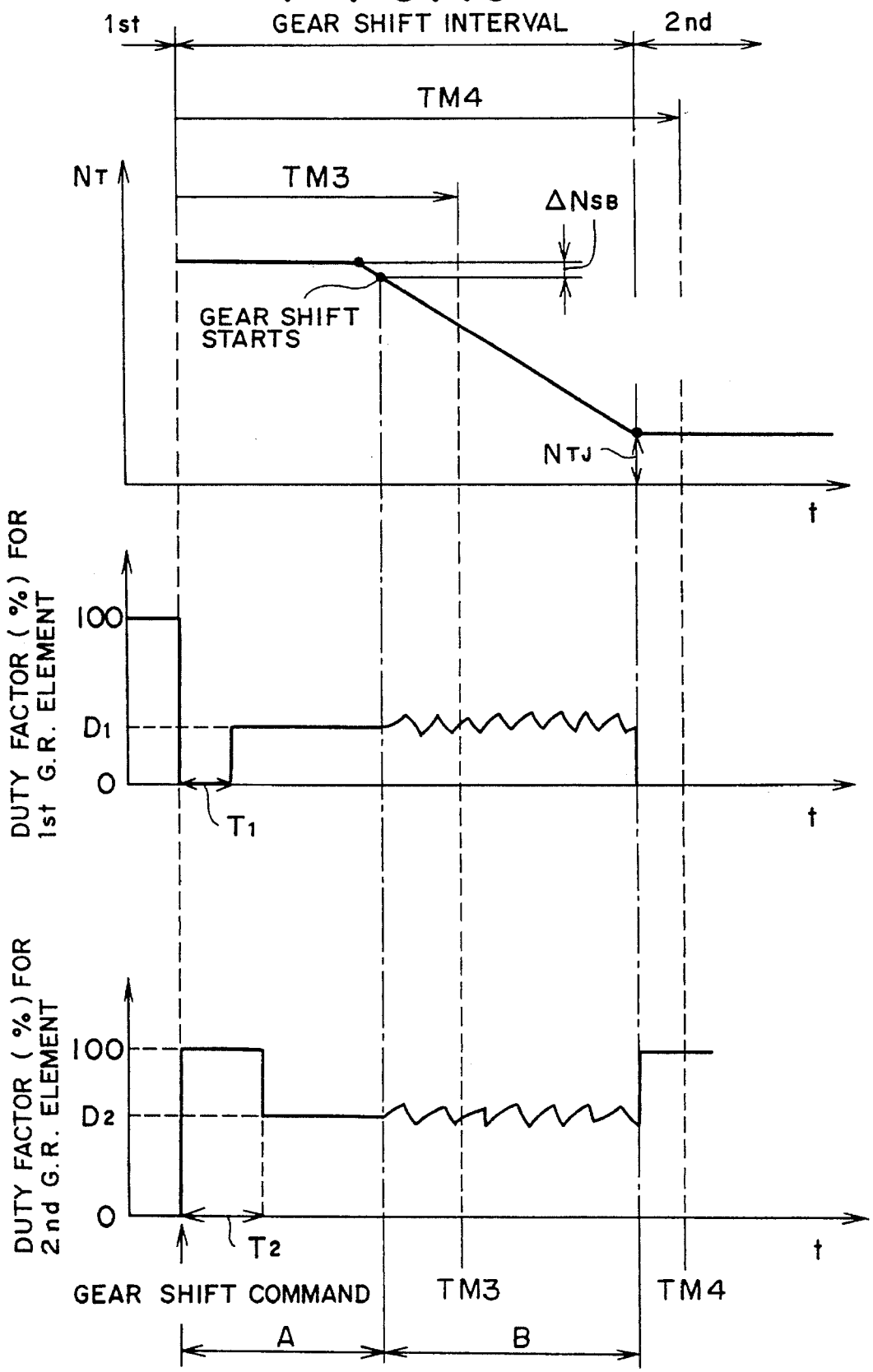
FIG. 10 is a timing chart associated with the routine of FIG. 9, showing the variation of the rotational speed $N_T$ of the input shaft to the transmission (the top curve) and the waveforms of the duty factors of the friction elements for the first and the second gear ratio (the middle and the bottom waveforms)
Figure 11:
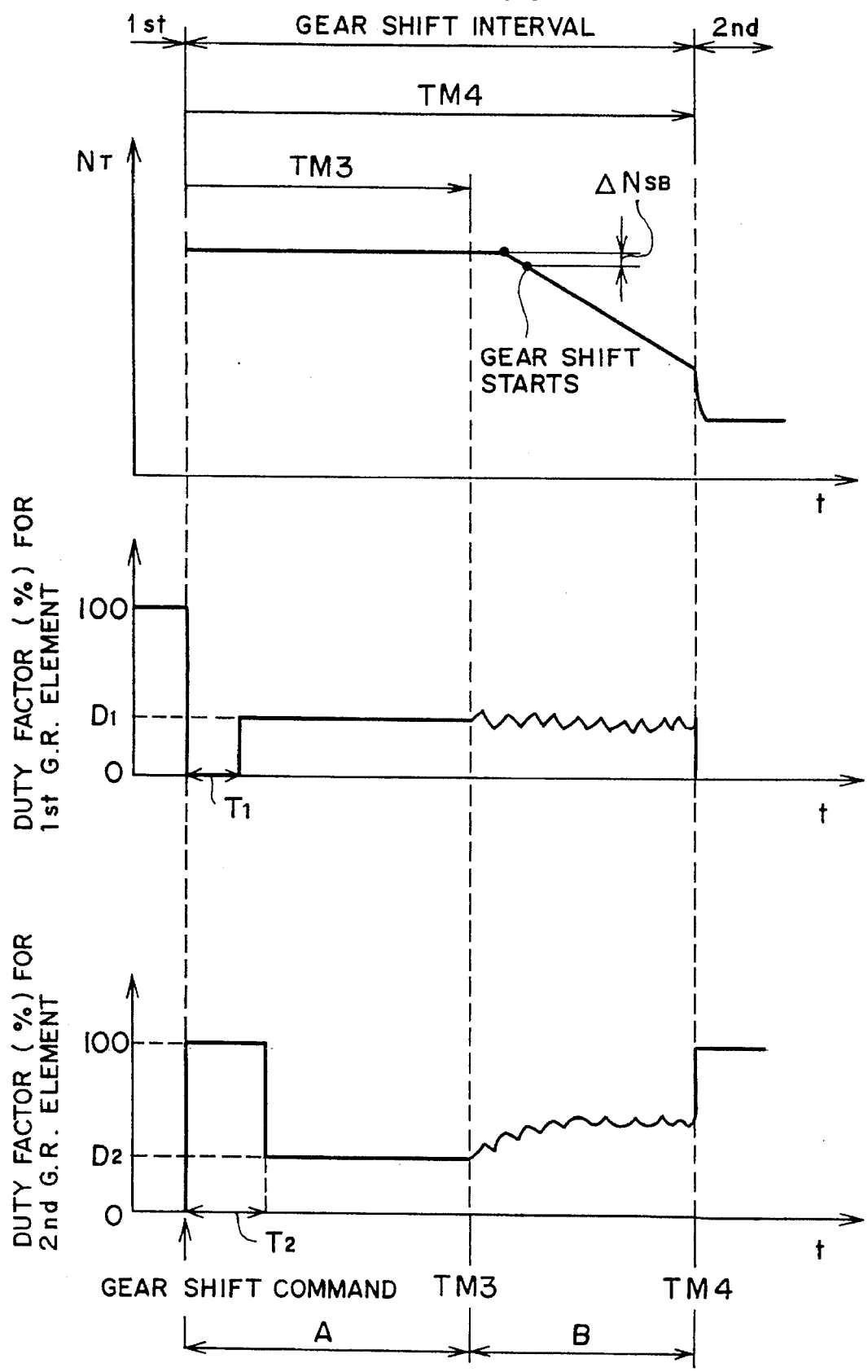
FIG. 11 is a timing chart similar to that of FIG. 10, but showing the waveforms in the case where the gear shifting operation is not terminated within a predetermined interval.

FIG. 9 is a flowchart showing an alternative gear shifting operation control routine. FIG. 10 is a timing chart associated with the routine of FIG. 9, showing the variation of the rotational speed $N_T$ of input shaft to the transmission (the top curve) and the waveforms of the duty factors of the friction elements for the first and the second gear ratios (the middle and the bottom waveforms). FIG. 11 is a timing chart similar to that of FIG. 10, but showing the waveforms in the case where the gear shifting operation is not terminated within a predetermined interval. The routine of FIG. 9 is similar to that of FIG. 6, except that a single timer tm is used instead of two timers $t_1$ and $t_2$.

Thus, at step S300, the timer $t_m$ is started when the gear shift command is issued. At step S301, the duty factors of the solenoid valves for the friction elements involved in the gear shifting operation are controlled in accordance with predetermined patterns. This is the control interval A, and the step S301 corresponds to step S201 of FIG. 6 At step S302, it is judged whether or not the decrement $\Delta N_T$ of the rotational speed of the input shaft $N_T$ is greater than or equal to a predetermined reference level $\Delta N_{SB}$. The affirmative judgement (i.e., $\Delta N_{SB} \leq \Delta N_T$) implies that the actual gear shift has begun. If the judgment is affirmative at step S302, the execution proceeds to step S303, where the feedback control for the interval B is performed. The step S303 corresponds to step S205 of FIG. 6. On the other hand, if the judgment is negative at step S302, the execution proceeds step S305, where it is judged whether or not the time $t_m$ is greater than or equal to an upper limit TM3 for the interval A. If the judgment is negative at step S305, the execution returns step S300 to repeat the steps S301, S302 and S305. If the judgment is affirmative at step S305, the execution proceeds to step S303.

At step S304, it is judged whether or not the current rotational speed $N_T$ of the input shaft is less than or equal to a predetermined reference level $N_{TJ}$ of the rotational speed of the input shaft at the completion of the gear shifting operation. The affirmative judgment (i.e., $N_{TJ} \geq N_T$) implies that the gear shift has been completed. If the judgment is affirmative at step S304, the execution proceeds to step S307, where the timer $t_m$ is cleared and the gear shift control operation of FIG. 9 is terminated. On the other hand, if the judgment is negative at step S304, the execution proceeds to step S306, where it is judged whether or not the time $t_m$ is greater than or equal to a predetermined upper limit TM4 for the length of the sum of the intervals A and B. If the judgment is negative at step S306, the execution returns to step S303 to repeat the steps S303, S304, and S306. If the judgment is affirmative at step S306, the execution proceeds to step S307 to terminate the gear shift control routine. As shown in FIGS. 10 and 11, the control method in the two intervals A and B are the same as in the case of the routine of FIG. 6.

What is claimed is:

1. A controller device for a vehicle automatic transmission (2) including: at least one friction element (2A) whose engagement/disengagement state is changed during a gear shifting operation; and actuator means (3) for engaging and disengaging said friction element in response to a control signal; said controller device comprising:

rotational speed sensor means (4b) for detecting a rotational speed of an input shaft (26) of said automatic transmission;

first shift control means, coupled to said rotational speed sensor means, for controlling said actuator means in accordance with a first control method over a first control interval (A), wherein said first control interval is initiated in response to a shift command and terminated in response to an earliest one of a change in said rotational speed of said input shaft of said automatic transmission being detected, and a length of said first control interval exceeding a first predetermined upper limit (TM1; TM3); and second shift control means for controlling said actuator means in accordance with a second control method over a second control interval (B) beginning at a termination of said first control interval, wherein said second control interval is terminated in response to an earliest one of said rotational speed of said input shaft of said automatic transmission reaching a predetermined level corresponding to a completion of said gear shifting operation, and a length of said second control interval exceeding a second predetermined upper limit (TM2; TM4-TM3).

2. A controller device as claimed in claim 1, wherein said actuator means includes an electric oil pressure converter valve.

3. A controller device as claimed in claim 2, wherein said electric oil pressure converter valve is a solenoid valve.

4. A controller device as claimed in claim 1, further comprising:

a first timer for measuring a time starting at a beginning of said first control interval; and a second timer for measuring a time starting at a beginning of said second control interval;

wherein said first shift control means terminates said first control interval when a time measured by said first timer exceeds said first predetermined upper limit, and said second shift control means terminates said second control interval when a time measured by said second timer exceeds said second predetermined upper limit.

5. A controller device as claimed in claim 1, further comprising:

a timer for measuring a time starting at a beginning of said first control interval;

wherein said first shift control means terminates said first control interval when a time measured by said timer exceeds said first predetermined upper limit, and said second shift control means terminates said second control interval when a time measured by said timer exceeds a sum of said first and second predetermined upper limits.

6. A controller device as claimed in claim 1, wherein said first shift control means controls said actuator means in accordance with a predetermined pattern in such a manner that said friction element is engaged with a predetermined amount of slip at an actual start of gear shifting operation.

7. A controller device as claimed in claim 1, wherein said second shift control means controls said actuator means in accordance with a feedback control.

8. A controller device as claimed in claim 7, wherein said second shift control means controls said actuator means in accordance with a feedback control in such a manner that a rate of change of said rotational speed of said input shaft of said automatic transmission is controlled to a predetermined target level.

* * * * *